United States Patent [19] [11] 4,412,380
Kish [45] Nov. 1, 1983

[54] HOSE CUTOFF DEVICE OR TOOL

[75] Inventor: Arthur S. Kish, Lyndhurst, Ohio

[73] Assignee: Murray Corporation, Cockeysville, Md.

[21] Appl. No.: 298,647

[22] Filed: Sep. 2, 1981

[51] Int. Cl.³ .............. B23D 21/06

[52] U.S. Cl. .............. 30/92; 30/91.2; 30/253

[58] Field of Search .............. 30/92, 91.2, 253

[56] References Cited

U.S. PATENT DOCUMENTS

| | | | |
|---|---|---|---|
| 1,075,439 | 10/1913 | Quinlin | 30/92 |
| 1,337,263 | 4/1920 | Pfeifer | 30/253 |
| 2,292,729 | 8/1942 | Woodward | 30/91.2 |
| 2,468,407 | 4/1949 | Pifer | 30/91.2 |
| 3,120,143 | 2/1964 | Kreider | 30/92 |
| 3,254,407 | 6/1966 | Apa et al. | 30/91.2 |
| 3,302,285 | 2/1967 | Mann | 30/92 |
| 3,807,046 | 4/1974 | Igyarto | 30/92 |
| 3,959,877 | 6/1976 | Zorzenon | 30/91.2 |
| 4,368,577 | 1/1983 | Babb | 30/92 |

FOREIGN PATENT DOCUMENTS

| | | | |
|---|---|---|---|
| 1378359 | 10/1964 | France | 30/91.2 |

*Primary Examiner*—Frederick R. Schmidt
*Assistant Examiner*—J. T. Zatarga
*Attorney, Agent, or Firm*—Isler & Ornstein

[57] ABSTRACT

A hose cutoff device or tool is disclosed which is especially adapted for cutting lengths of hose for use in hose assemblies for automotive air-conditioning systems. The device or tool comprises a base which is provided with axially-spaced, axially aligned, tubes for the reception of the hose to be cut, and with a manually-operable handle which is pivotally secured to the base, and is provided with a cutter blade which is movable through the hose to sever the hose into desired lengths. The cutter blade is of unique design or construction, is removably secured to the handle, and can be quickly and easily replaced when worn. A guard is provided for limiting movement of the handle away from the base and for partially enclosing the cutter blade.

1 Claim, 6 Drawing Figures

HOSE CUTOFF DEVICE OR TOOL

BACKGROUND OF THE INVENTION

In automotive air conditioning systems, hose assemblies are employed, consisting essentially of a hose, a shell crimped to the end of the hose, and a fitting.

The hose may be of different sizes or diameters and wall thicknesses, and made, for example, of seamless oil-resistant synthetic rubber.

The hose is cut into desired lengths, from a stock length of hose or reel, and then assembled with the shell and fitting.

The manner in which such hose assemblies are made is disclosed, for example, in my copending application, Ser. No. 284,967, filed July 20, 1981.

SUMMARY OF THE INVENTION

The invention has as its primary object the provision of a device or tool of the character described, which is especially adapted for cutting rubber hose into desired lengths, for use, for example, in making hose assemblies for automotive air conditioning systems.

Another object of the invention is to provide a device or tool of the character desired, which can be quickly and easily assembled from parts which are of simple and inexpensive construction.

Another object of the invention is to provide a device or tool of the character described, which consists of a minimum number of parts, and is compact in construction.

A further object of the invention is to provide a device or tool of the character described, which can be easily mounted on a work table or workbench, for use, and can be stored in a small area or space, when not in use.

A still further object of the invention is to provide a device or tool of the character described, which utilizes a cutter or hose cutting blade of unique design or construction, and which can be quickly and easily replaced, after a long period of wear or use.

A still further object of the invention is to provide a device or tool of the character described, which is easy to use, and requires a minimum of effort to manipulate.

Other objects and advantages of this invention will become apparent in the course of the following description.

BRIEF DESCRIPTION OF THE DRAWINGS

The present invention may be better understood and the numerous objects and advantages thereof will become apparent to those skilled in the art by reference to the accompanying drawings, wherein like reference numerals refer to like elements or parts in the various figures, and in which.

DESCRIPTION OF A PREFERRED EMBODIMENT

Figure 1:
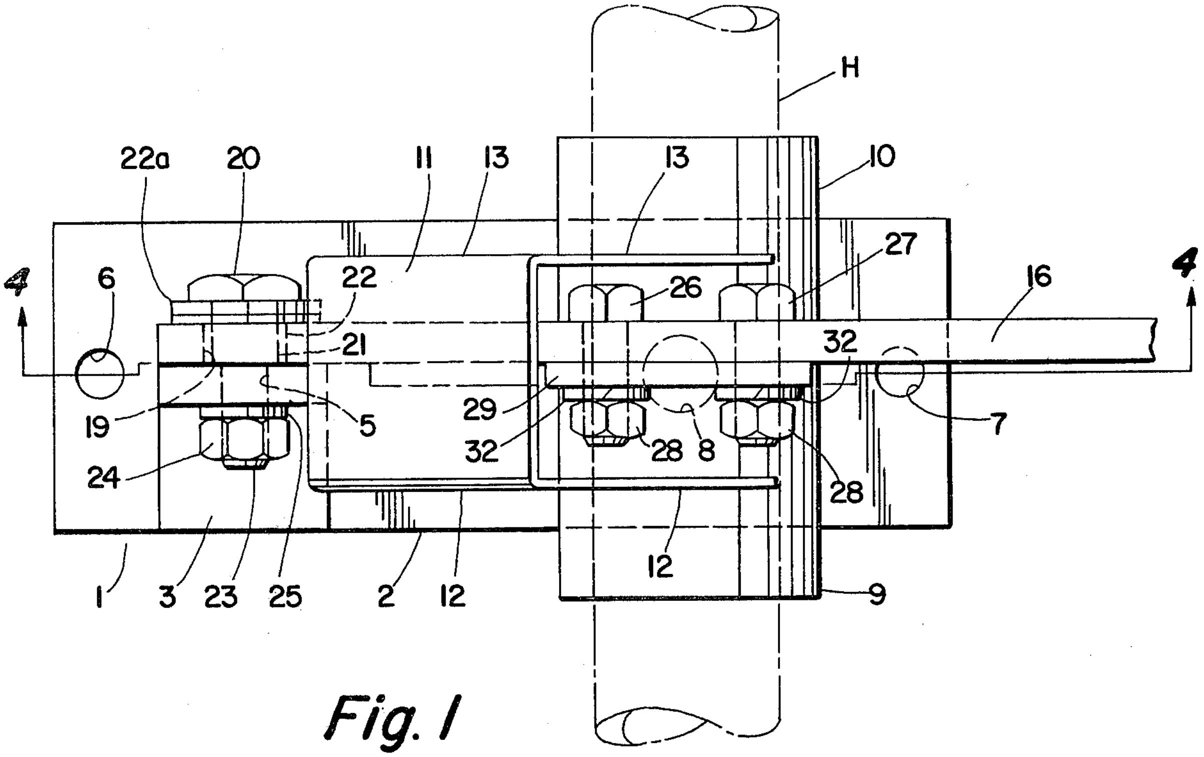
FIG. 1 is a top plan view of a hose cutoff device or tool embodying the invention.
Figure 2:
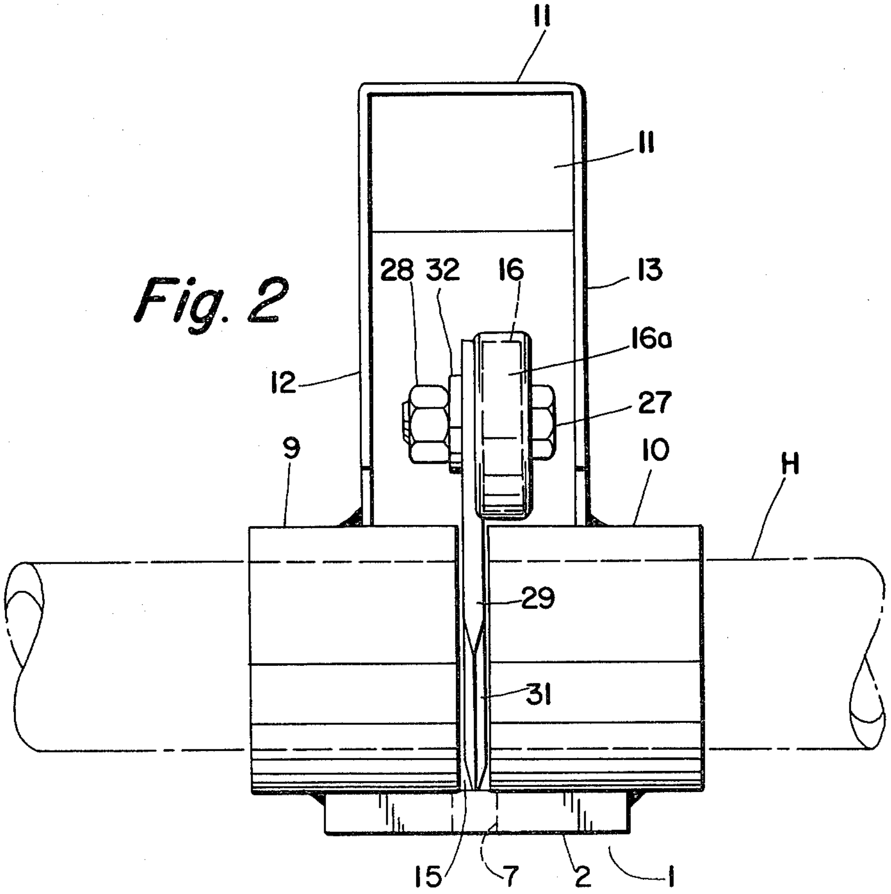
FIG. 2 is an end elevational view of the hose cutoff device or tool, as viewed from the right end of FIG. 1.

Referring more particularly to the drawings, the hose cutoff device or tool will be seen to comprise a base weldment, designated generally by reference numeral 1, and consisting of a rectangular base 2, a bracket 3 welded to the base 2, and having an upright flange 4 having an opening 5 therein.

The base 2 of the base weldment is provided with holes or openings 6 and 7 adjacent its ends, through which bolts (not shown) may be inserted for the purpose of rigidly securing the device to a table or workbench, and is further provided with a hole or opening 8 adjacent the hole or opening 7, the hole 8 being of larger diameter than the holes 6 and 7, and serving a purpose to be presently described.

The base weldment also comprises a pair of axially-spaced tubular members or tubes 9 and 10, which are welded to the base 2, extend transversely of the base and are in axial alignment with each other, these tubular members serving a purpose to be presently described.

The base weldment further comprises a guard of generally U-shaped or channel-shaped configuration, having a flat base portion 11, which extends at an angle of about 32° to the base 2, and parallel legs or sides 12 and 13 which extend downwardly from the marginal edges of the base portion 11, perpendicularly to the base portion 11, and have arcuate lower edges 14 welded to the tubular members 9 and 10.

The axial spacing of the tubular members 9 and 10 provides a space 15 therebetween, which serves a purpose to be presently described.

The device or tool further comprises an elongated handle 16, which extends through the guard 11-12-13 rearwardly towards the bracket 3, and has welded thereto a depending tab 17 of generally rectangular configuration, and having at its lower edge a bevelled surface 18, which serves a purpose to be presently described. The handle 16 is provided with a grip **16*a*** of a plastic material.

The tab 17 is provided with an opening 19, which is adapted to be aligned with the opening 5 in the bracket 3.

The handle 16 is pivotally secured to the bracket 3 by means of a shoulder bolt 20 having a shank 21 which extends through the opening 19 in the tab 17, a bushing 22 being interposed between the shank 21 and the wall of the hole 19. A spring washer **22*a* is interposed between the head of the bolt 20 and the tab 17**.

The bolt 20 has a reduced threaded portion 23 which extends through the opening 5 in the flange 4 of the bracket 3, the bolt being secured to the flange 4 by means of a nut 24 and lock washer 25.

Secured to the handle 16, as by means of bolts 26 and 27, and nuts 28, is a hose cutter or cutter blade 29 having sharp cutting edges 30 and 31 at its lower edge, which cutting edges extend at an angle of approximately 90° to each other. Lock washers 32 are interposed between the cutter blade 29 and the nuts 28.

The use of the device or tool for cutting hose will now be briefly described.

Figure 3:
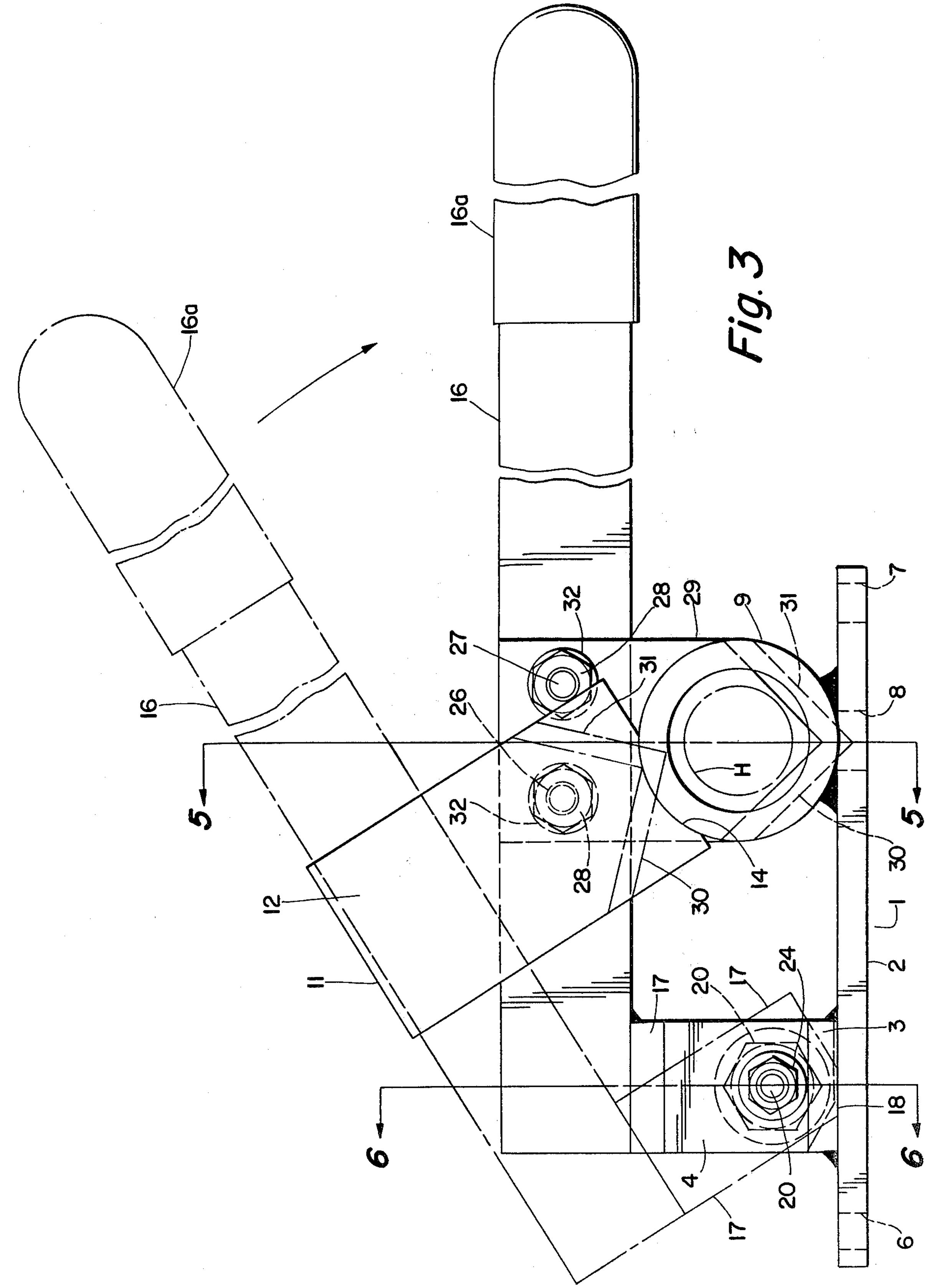
FIG. 3 is a side elevational view of the hose cutoff device or tool, as viewed from the left end of FIG. 2.
Figure 4:
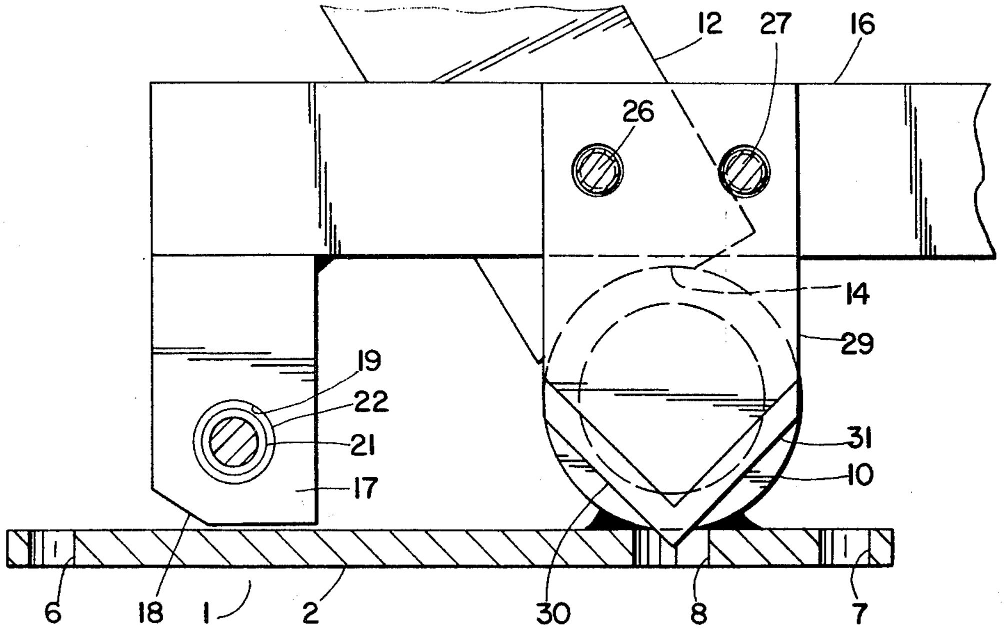
FIG. 4 is a cross-sectional view, taken on the line 4—4 of FIG. 1.
Figure 5:
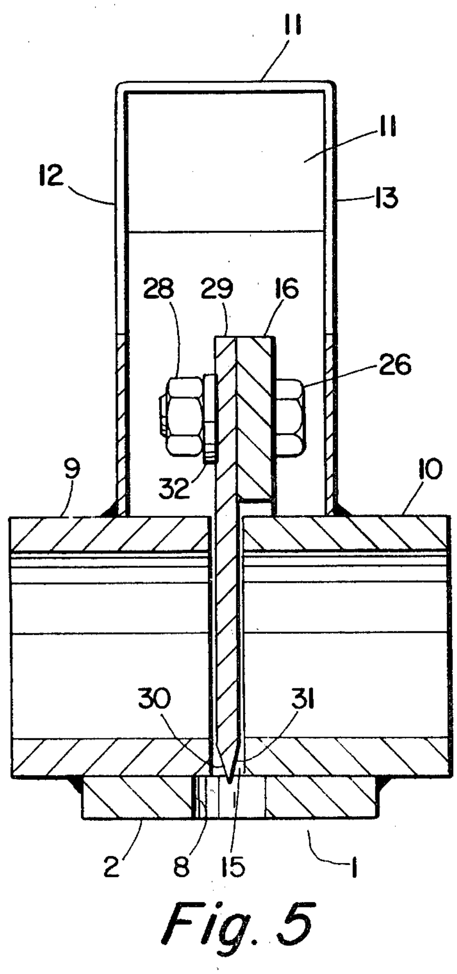
FIG. 5 is a cross-sectional view, taken on the line 5—5 of FIG. 3.
Figure 6:
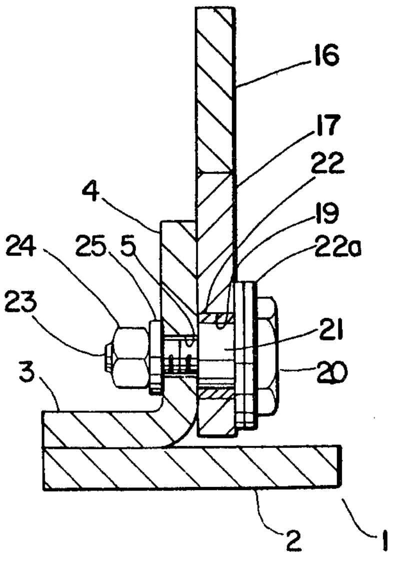
FIG. 6 is a cross-sectional view, taken on the line 6—6 of FIG. 3.

With the handle 16 of the device in the position shown in broken lines in FIG. 3, that is to say, with the handle in abutment with the base portion 11 of the guard 11-12-13, the cutter blade 29 is disposed in a plane which is coplanar with the space 15 between the inboard ends of the tubular members 9 and 10, and, so that the edges 30 and 31 of the blade are disposed immediately above the passageway through the tubular members, as best seen in broken lines in FIG. 3.

The movement of the handle 16 to the position referred to above, is permitted by reason of the clearance provided between the base 2 and the bevelled edge 18 of the tab 17.

The desired length of hose H to be cut is marked on the surface of the hose, and the hose is then passed through the tubular members 9 and 10 until the mark on the hose is aligned with the space 15, after which the handle 16 is moved downwardly to the position shown in solid lines in FIG. 3, thereby causing the cutting edges 30 and 31 of the cutter blade to descend into the space 15, and cut through the hose H. The hole 8 in the base 2 permits the intersecting portions of the cutting edges of the blade to enter this hole, to thereby insure that the blades has cut entirely through the hose.

After the hose H has been cut, the handle 16 is restored to its initial position, and the length of hose which has been cut is removed from the device.

It is thus seen that I have provided a device or tool which is eminently adapted for cutting hose; which consists of a minimum number of parts which can be manufactured at low cost and quickly and easily assembled; which can be mounted on a worktable or workbench for use, and which, when not in use, can be stored in a small space or area.

While there has been described above the principle of the invention, it is to be clearly understood that this description is only by way of example, and not as a limitation to the scope of the invention.

Having thus described my invention, I claim:

1. A hose cutter or device of the character described comprising a base, a pair of axially-spaced and axially-aligned cylindrical tubes mounted on said base and extending transversely thereof, said cylindrical tubes adapted to receive the hose to be cut, a bracket welded to said base and having an upright flange, an elongated handle pivotally secured to said flange, a cutter blade removably secured to said handle, said cutter blade being of generally rectangular configuration and having cutting edges extending at an angle to each other, said handle adapted to be moved toward said base and into the space between said cylindrical tubes, and a guard of inverted U-shaped configuration comprising a flat base portion and parallel legs or sides extending downwardly from the marginal edges of said base portion and welded to said cylindrical tubes, said base portion adapted to prevent said handle from being moved beyond a predetermined point relatively to said base.

* * * * *